(12) United States Patent
Zhou et al.

(10) Patent No.: US 9,674,438 B2
(45) Date of Patent: Jun. 6, 2017

(54) LOW LIGHT VIDEO IMAGE STABILIZATION STRENGTH MODULATION

(71) Applicant: Apple Inc., Cupertino, CA (US)

(72) Inventors: Jianping Zhou, Fremont, CA (US); Sebastien X. Beysserie, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 61 days.

(21) Appl. No.: 14/467,998

(22) Filed: Aug. 25, 2014

(65) Prior Publication Data

US 2016/0006935 A1 Jan. 7, 2016

Related U.S. Application Data

(60) Provisional application No. 62/021,153, filed on Jul. 6, 2014.

(51) Int. Cl.
H04N 5/232 (2006.01)

(52) U.S. Cl.
CPC ..... *H04N 5/23254* (2013.01); *H04N 5/23258* (2013.01); *H04N 5/23267* (2013.01)

(58) Field of Classification Search
CPC .................................................. H04N 5/23254
See application file for complete search history.

(56) References Cited

U.S. PATENT DOCUMENTS

| | | | |
|---|---|---|---|
| 7,359,563 B1 | 4/2008 | Dua | |
| 7,817,187 B2 | 10/2010 | Silsby | |
| 8,335,350 B2 | 12/2012 | Wu | |
| 8,520,084 B2 | 8/2013 | Tsai | |
| 8,711,233 B2 | 4/2014 | Jefremov | |
| 8,749,644 B2 | 6/2014 | Lee | |
| 8,947,529 B2 | 2/2015 | Strine | |
| 9,100,575 B2 | 8/2015 | Lee | |

(Continued)

FOREIGN PATENT DOCUMENTS

WO 2014147285 A1 9/2014

OTHER PUBLICATIONS

Zhou, et al., "Video Rolling Shutter Correction For Lens Movement In Optical Image Stabilization Cameras," U.S. Appl. No. 14/547,107, filed Nov. 18, 2014.

*Primary Examiner* — Padma Haliyur
(74) *Attorney, Agent, or Firm* — Blank Rome LLP (57) ABSTRACT

Techniques to improve a digital image capture device's ability to stabilize a video stream in low light capture conditions are presented. In general, techniques are disclosed for stabilizing video images using an overscan region and a look-ahead technique enabled by buffering a number of video input frames before generating a first stabilized video output frame. More particularly, techniques are disclosed for buffering an initial number of input frames so that a "current" frame can use time stamped image capture device motion data from both "past" and "future" frames to adjust the strength of a stabilization metric value so as to keep the current frame within its overscan. The calculated adjustments to the strength of the stabilization metric value for a particular frame may be limited to a target max strength value that is determined based, at least in part, on an estimated amount of motion blur in the current frame.

20 Claims, 9 Drawing Sheets

(56) References Cited

U.S. PATENT DOCUMENTS

| | | |
|---|---|---|
| 2011/0096179 A1 | 4/2011 | Border |
| 2011/0234825 A1 | 9/2011 | Liu |
| 2013/0135430 A1 | 5/2013 | Liu |
| 2013/0141602 A1 | 6/2013 | Kuriyama |
| 2014/0132784 A1* | 5/2014 | Chouly ................... G06T 5/003 348/208.1 |
| 2014/0160309 A1 | 6/2014 | Karpenko |

* cited by examiner

LOW LIGHT VIDEO IMAGE STABILIZATION STRENGTH MODULATION

CROSS-REFERENCE TO RELATED APPLICATION

This application claims priority to U.S. Provisional Application Ser. No. 62/021,153, filed Jul. 6, 2014, which is hereby incorporated by reference in its entirety.

BACKGROUND

This disclosure relates generally to the field of digital photography. More particularly, but not by way of limitation, it relates to techniques for improved stabilization of video frames captured in low light conditions by taking into account motion blur within the video frames.

A standard rule of thumb for capturing sharp, handheld imagery is that the camera's shutter speed should not be less than its shutter speed equivalent to the focal length of the lens. This rule holds that a 500 millimeter (mm) lens shouldn't be handheld at shutter speeds slower than $\frac{1}{500}$-second, a 300 mm lens slower than $\frac{1}{300}$-second, a 50 mm lens slower than $\frac{1}{50}$-second, and a 20 mm lens slower than $\frac{1}{20}$-second.

With the application of software- and/or hardware-based stabilization technology, jitter caused by camera movement may be minimized, making it possible to transform shaky, handheld footage into steady, smooth shots. One way to stabilize a video is to track a salient feature in the image and use this as an anchor point to cancel out all perturbations relative to it. This approach requires a priori knowledge of the image's content to, for example, identify and track a person or other salient object in the scene. Another approach to image stabilization searches for a "background plane" in a video sequence, and uses its observed distortion to correct for camera motion. In yet another approach, gyroscopically controlled electromagnets shift a floating lens element orthogonally to the optical axis along the horizontal and vertical plane of the image in a direction that is opposite that of the camera movement. Doing this can effectively neutralize any sign of camera shake. In a similar type of operation, a camera's imaging sensor is translated in the opposite direction of the camera's movements in order to dampen the effects of camera shake.

One limitation of current video stabilization techniques is that they do not do a good job of accounting for so-called "motion blur" occurring in images, e.g., due to the user's hand shaking during video capture. "Motion blur" may be defined as the apparent "streaking" of rapidly moving pixels in a still image or a sequence of images. Motion blur results when the composition of the image being recorded changes during the recording of a single frame, either due to rapid movement (of the camera or objects in the scene being captured) or long exposure, i.e., integration, times.

The difficulties associated with stabilizing video frames exhibiting motion blur are further exacerbated in low light conditions due to the increased integration times needed to capture sufficient light in the recorded video frames. Longer integration times result in more motion blur in the recorded video frame. When such "low light" video is stabilized, the residual motion blur and associated "shimmering artifacts" often appear visible in the stabilized video. This may make the stabilized videos look unnatural and does not provide the user with the perceptual clues of video movement that would normally be associated with the presence of motion blur within a video frame.

Thus, what is needed are techniques to modulate the video stabilization strength parameter used to stabilize particular recorded video frames in a sequence of captured frames based, at least in part, on an estimated amount of motion blur in the particular video frame. Such techniques are also preferably power efficient and computationally efficient.

SUMMARY

In one embodiment the disclosed concepts provide a method to stabilize a video stream as it is being captured. The method includes capturing a first time-sequenced set of images (e.g., a video stream), where each image has a capture time and motion information (the motion information provided by one or more motion sensors such as gyroscopes or accelerometers). Next, the method includes selecting a current image from the first time-sequenced set of images and identifying a first stabilization strength value for the current image. The method may also determine an adjustment to the first stabilization strength value based, at least in part, on an estimated amount of motion blur in the current image, wherein the estimated amount of motion blur in the current image is based, at least in part, on at least part of the motion information associated with the current image. Finally, the method may apply that adjusted stabilization strength value to the current image to stabilize the current image and then store the stabilized current image in a memory. In some embodiments, the method may calculate the beginning and ending integration time for each row of pixels in the captured image, based on the frame capture timestamp, the rolling shutter readout time, and exposure time. A computer executable program to implement the method may be stored in any media that is readable and executable by a computer system.

DETAILED DESCRIPTION

This disclosure pertains to systems, methods, and computer readable media to more effectively stabilize low light video in real-time (i.e., as it is captured). In general, techniques are described herein for stabilizing video images using an "overscan" region and a look-ahead buffer comprising a number of video input frames, although it is to be understood that the low light video image stabilization improvement techniques described herein may be employed in conjunction with any desired video image stabilization approach. ("Overscan" is the term given to the buffer of pixels around the edges of an image that are captured but not displayed to the user.) More particularly, techniques are disclosed herein for estimating the amount of motion blur in a "current" frame, e.g., by using motion data from either or both of "past" and "future" frames (in addition to motion data for the "current" frame) to adjust or modulate the strength of a video stabilization metric value so as to reduce the "shimmering" artifacts associated with residual motion blur in the stabilized image. This motion blur-aware video stabilization strength modulation capability permits better video stabilization performance in low light conditions, where integration times tend to be longer, thus leading to a greater amount of motion blurring and the attendant "shimmering" artifacts in the output stabilized video.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation are described. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that, in the development of any actual implementation (as in any software and/or hardware development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design an implementation of video processing systems having the benefit of this disclosure.

One approach to video stabilization that makes use of a tunable video stabilization strength value is to first determine what sort of activity is causing the detected camera motion, set the tuning value accordingly, and stabilize in accordance with that value. For example, if no motion is detected, it may be possible to classify the "type of motion" as stationary and, as a result, apply very strict stabilization. If, on the other hand, a lot of camera motion is detected along a single axis, it may be possible to classify the type of motion as "strolling" (i.e., akin to what would be captured if the video was being recorded while the user was walking), at which point a different video stabilization strength value may be applied. One approach to video stabilization described herein monitors the motion of each frame, adjusting a stabilization tuning value based on that motion and the motion of a specified number of future and past frames. More specifically, video stabilization operations in accordance with such approaches buffer some number of incoming video frames, delaying the production of stabilized video output frames by the time required to capture these frames. This arrangement permits a "current frame" to use both "future" and "past" motion data. This, in turn, permits stabilization adjustments (the movement of individual frames within their overscan) of a current frame in a way that prepares for, or anticipates, the motion in future frames. This approach—or any other approach to video image stabilization—may be aided by the low light video image stabilization strength modulation techniques described herein. In particular, whatever value is determined for the tunable video stabilization strength metric by the video image stabilization routine may be altered, adjusted, attenuated, etc., either a priori or after the video stabilization strength metric has been calculated, based on an estimated amount of motion blur detected in the current frame being stabilized. As will be explained in further detail below, at a high level, the techniques described herein attempt to intelligently and gradually attenuate or limit the value of the video stabilization strength metric calculated by the employed video image stabilization approach as the amount of motion blur detected in the current frame increases.

Figure 1A:
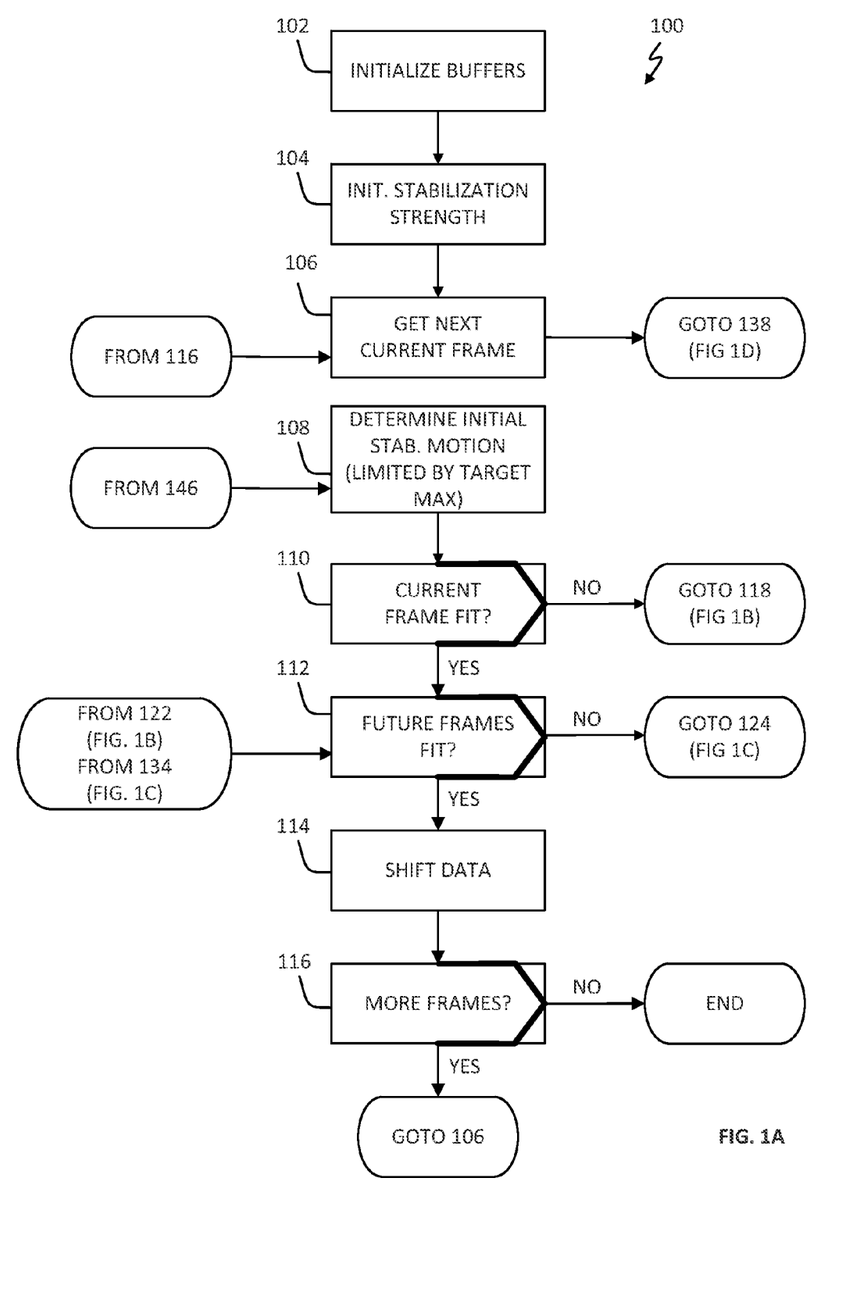
FIGS. 1A-1D show, in flowchart form, a video stabilization operation, in accordance with one embodiment.

Referring to FIG. 1A, video stabilization operation 100 in accordance with one embodiment of a video image stabilization approach begins by initializing a buffer system with an incoming stream of video frames (block 102). From this stream, image data and motion data (including, e.g., image capture device motion data and/or image blur data relating to various portions of the captured frame, as will be explained in further detail with reference to FIG. 1D) may be buffered for a specified number of frames before a first stabilized output frame is generated. Referring to FIG. 2A, buffer system 200 in accordance with one embodiment includes (N+1) entry frame buffer 205, and (2N+1) entry motion buffer 210. As each frame 215 arrives, it is placed into the $+N^{th}$ frame buffer entry with the frame's corresponding motion data placed into the $+N^{th}$ motion buffer entry. Frame motion data (e.g., frame metadata) may come from, for example, one or more gyroscopes and/or one or more accelerometers whose output is matched with, or synchronized to, the capture of video frames (e.g., video frame 215). Referring to FIG. 2B, as each new frame 220 arrives at buffer system 200, every entry already in frame buffer 205 and every entry in motion buffer 210 may be shifted to the left by one position as indicated by dotted lines 225. After being stabilized, frames shifted out of frame buffer entry 230 (the $0^{th}$ entry) may be routed 235 to long-term storage 240. Motion data shifted out of motion buffer entry 245 (the $0^{th}$ entry) may be discarded or retained. In buffer system 200, for example, motion buffer 210 includes (2N+1) total entries: N entries corresponding to frames captured before frame and motion entry 230 and 245 respectively (entries having negative prefixes), and N entries corresponding to frames captured after frame and motion entry 230 and 245 respectively (entries having positive prefixes). From the point of view of a frame in entry 230, positive-prefix motion entries correspond to frames captured in the "future" while negative-prefix entries correspond to frames captured in the "past." The difference in time between the capture of a frame placed into the $+N^{th}$ frame buffer entry and generation of a stabilized version of that frame from entry 230 may be thought of as the amount of time stabilization operation 100 looks into the "future." In one embodiment, frame buffer 205 may store a specified number of frames (e.g., 16, 24, 32). Because buffering frames can be expensive in terms of memory (e.g., one frame at 1080p video resolution can be between 2 and 3 megabytes, MB), the optimum size of frame buffer 205 may be dependent upon the available memory, the amount of delay time that is acceptable between initiation of video capture operation 100 and generation of a first stabilized output frame, and the intended use of the image capture device. (The size of motion buffer 210 may be small compared to frame buffer 205 as the only data generally stored there is camera motion data and/or image blur data.)

Returning to FIG. 1A, once frame 205 and motion 210 buffers have been initialized in accordance with block 102, an initial stabilization strength (S) (block 104) and a current frame may be selected (block 106). For the purposes of this disclosure, the "current frame" will be taken as that frame in frame buffer entry 230 (and motion data in motion buffer entry 245). A stabilization strength value may be thought of as a value used, in part, to determine a weighting or correction factor used to moderate movement of an image within its overscan region during stabilization operations. According to some embodiments described herein, the stabilization strength value may be limited to a target maximum strength based, at least in part, on amount of motion blur in the image. For example, at block 106, the operation 100 may proceed to block 138 of FIG. 1D.

Figure 1B:
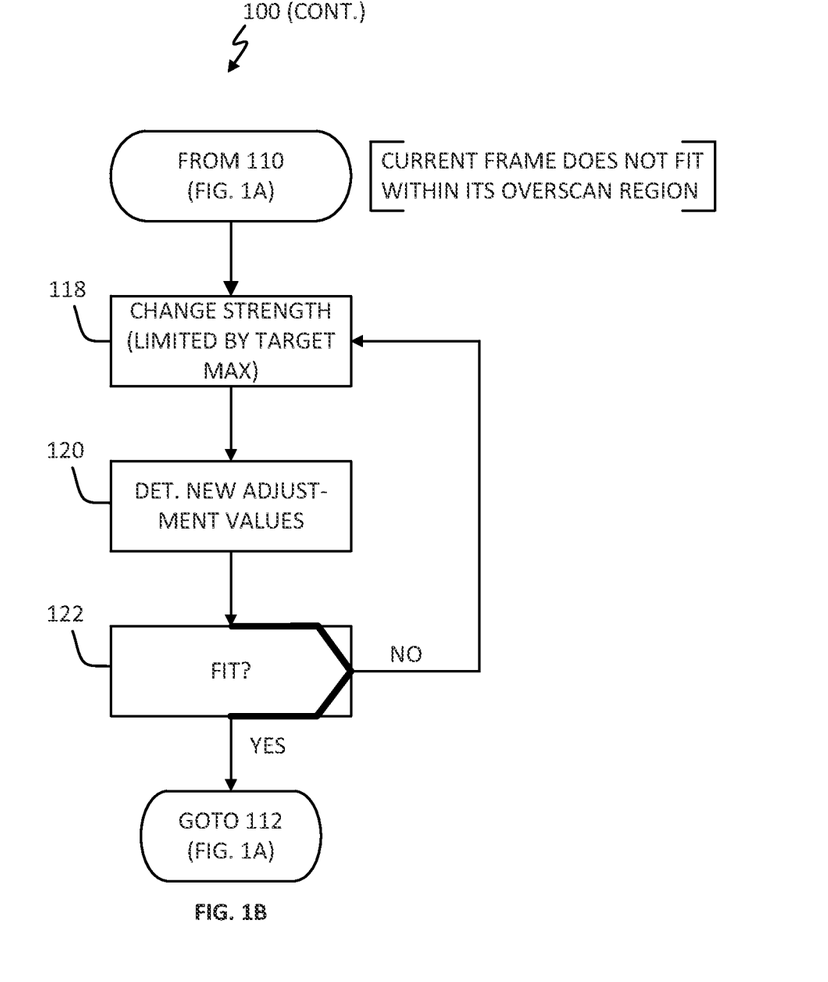
Figure 1C:
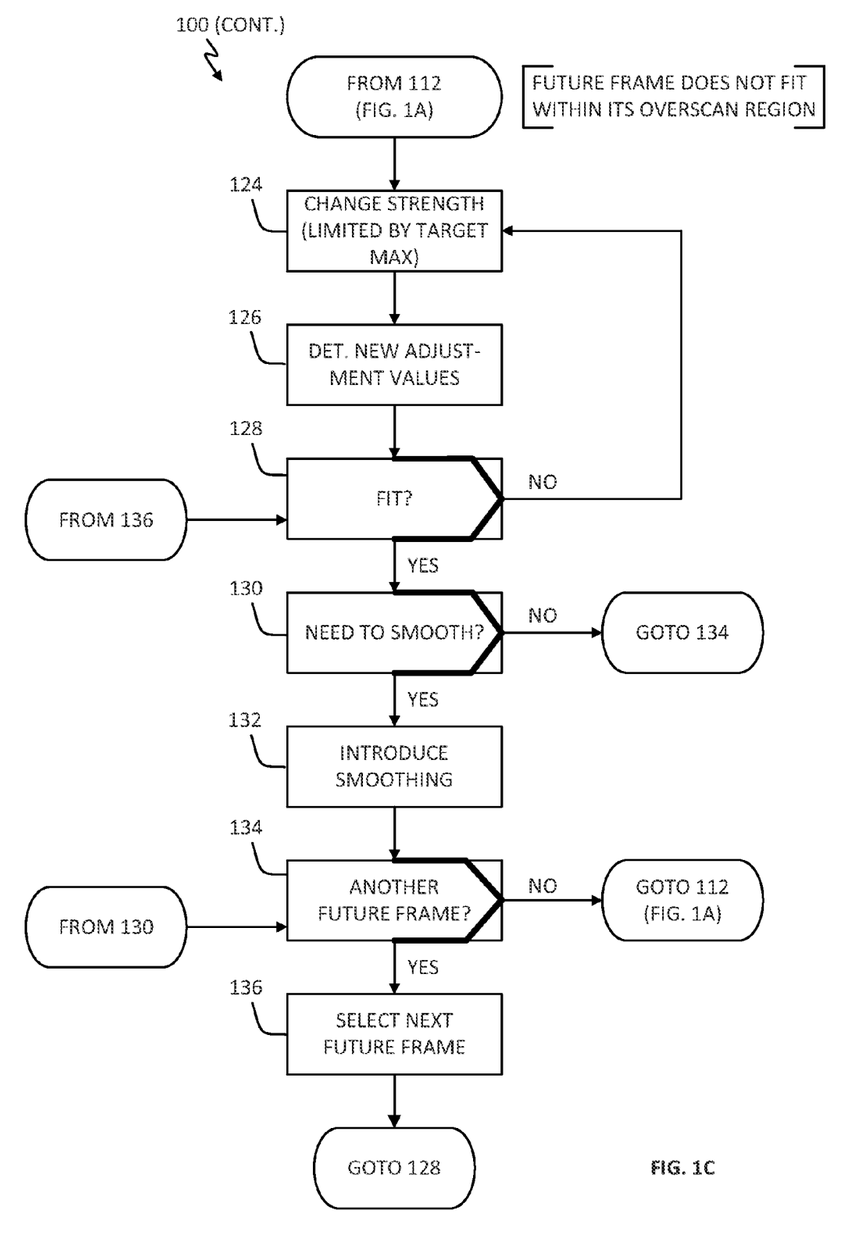
Figure 1D:
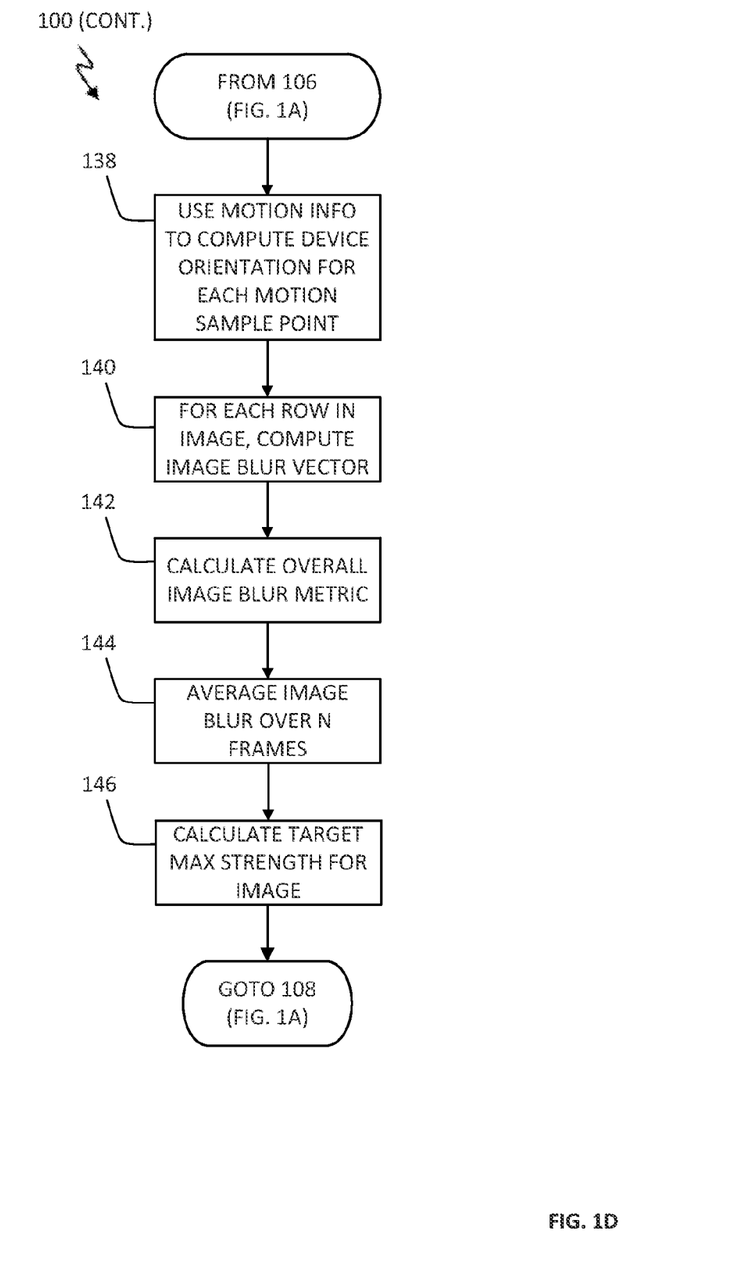
Figure 2A:
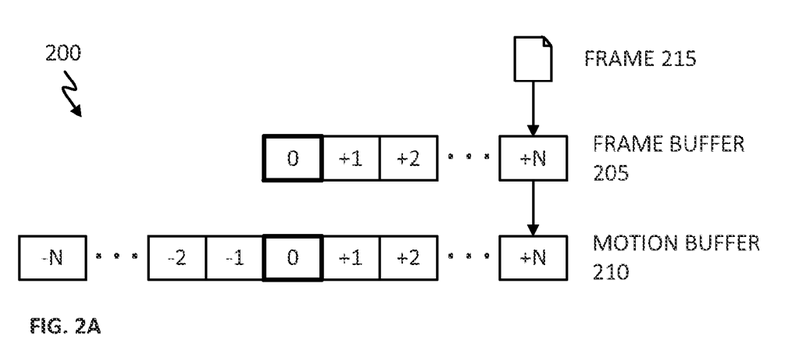
FIGS. 2A and 2B show, in block diagram form, a frame buffer system, in accordance with one embodiment.
Figure 2B:
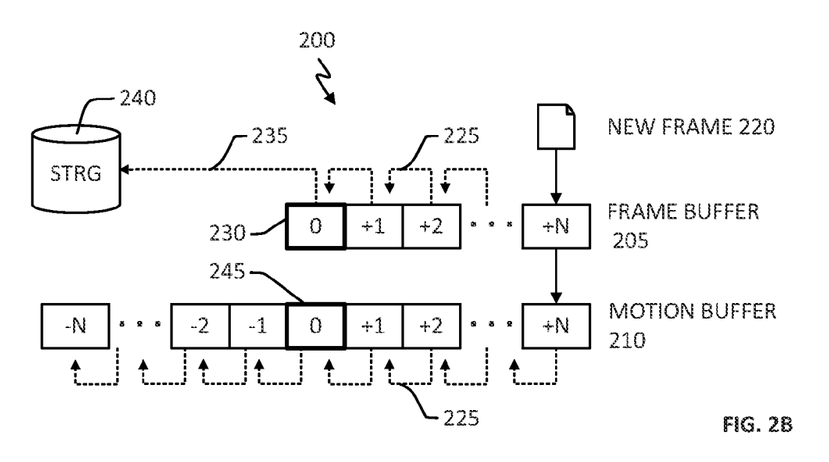

Referring now to FIG. 1D, the operation 100 may utilize motion information, e.g., time stamped gyroscope data points, to compute the image capture device's orientation for each gyroscope sample data point recorded during the capture of the current image (block 138). For each row of pixels in the current image, the operation may estimate an "image blur vector" (block 140). By estimating image motion blur using gyroscope samples (as opposed to complex image processing analysis), the power cost of the operation described herein is nearly negligible.

According to some embodiments, the image blur vector may be calculated by:
1.) Calculating the starting and ending integration times for the current row based on, e.g.: the frame capture timestamp, the rolling shutter readout time, and exposure time. The starting and ending integration times for a given pixel row, i, may be calculated using the following equations:

$$\text{startIntegration}\_i = \text{startIntegration}\_0 + i * \text{readoutTime}/\text{height}$$

$$\text{endIntegration}\_i = \text{startIntegration}\_i + \text{exposureTime};$$

2.) Calculating the camera orientation at the start of sensor integration by interpolating the gyroscope data based on time stamps;
3.) Calculating the camera orientation at the end of sensor integration by interpolating the gyroscope data based on time stamps;
4.) Calculating the camera rotation during the exposure period, i.e., the camera orientation change from the start of integration to the end of integration; and
5.) Calculating the image row blur vector and metric based on, e.g., camera rotation and lens position, f, which is based on lens motor current and calibration data.

According to some embodiments, the translation of the image during the frame capture in the x direction, tx, and y direction, ty, may be approximated by the following equations:

$$tx = f * R02/R22 \text{ (where } R02 \text{ refers to the entry in row 0 and column 2 of the full 3×3 rotation matrix, and } R22 \text{ refers to the entry in row 2 and column 2 of the full 3×3 rotation matrix); and}$$

$$ty = f * R12/R22 \text{ (where } R12 \text{ refers to the entry in row 1 and column 2 of the full 3×3 rotation matrix).}$$

Thus, the magnitude of the image row blur vector for a given row, i, i.e., the image row blur vector metric for row i, may be calculated using the following equation:

$$\text{blur}\_i = \text{sqrt}(tx * tx + ty * ty).$$

Those skilled in the art will understand that other techniques could be used to approximate the amount of blur present in the image, e.g., location-adaptive blur, blur estimates that take rotational motion in all three axes into account, etc. For the purposes described herein, however, only the blur due to translation along the axes perpendicular to the plane of the camera, e.g., tx or ty, are considered (since the dominant blur in the image will be due to image translation in the vast majority of images).

Next, the operation 100 may proceed to calculate the overall image blur metric based, e.g., on the weighted average of the image row blur vectors for each row in the image (block 142). According to one embodiment, the overall image blur is calculated according to the following equation:

$$\text{blur} = \text{sum } (w\_i * \text{blur}\_i)/\text{sum } (w\_i) \text{ (where } w\_i \text{ is the weight assigned to row } i).$$

As those of skill in the art will understand, various weighting schemes may be employed, such as a center-weighted scheme, a simple average, a median, a max, or a center-only weighting scheme, etc. Normally, central rows in the image will be weighted more heavily since human observers are typically more sensitive to motion in the center of images than at the periphery.

Next, the operation 100 may optionally proceed to averaging the overall image blur metric over some number, n, of consecutive frames (block 144). One motivation for averaging the overall image blur metric over a predetermined number of frames is so that there is no abrupt change in video stabilization strength. While a simple moving average of n frames could be employed, those skilled in the art will understand that other approaches could also be employed, such as taking the mean, median, etc. of the overall image blur metric values for the n frames being considered and using it as the average overall image blur metric value.

Figure 5A:
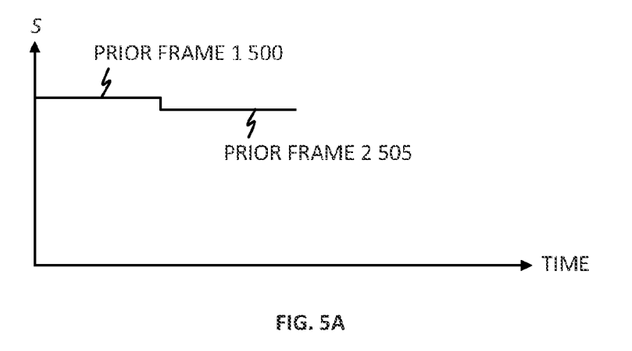
FIGS. 5A and 5B illustrate the use of a smoothing trajectory, in accordance with one embodiment.
Figure 5B:
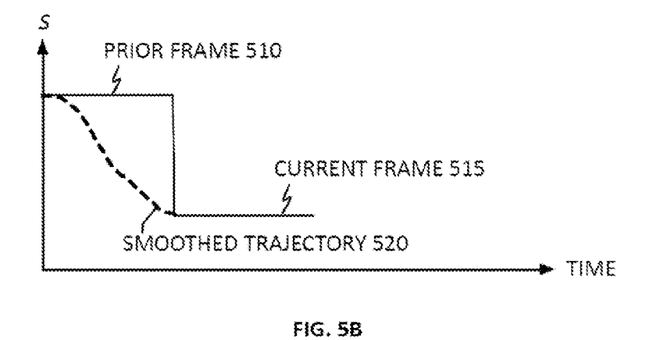
Figure 5C:
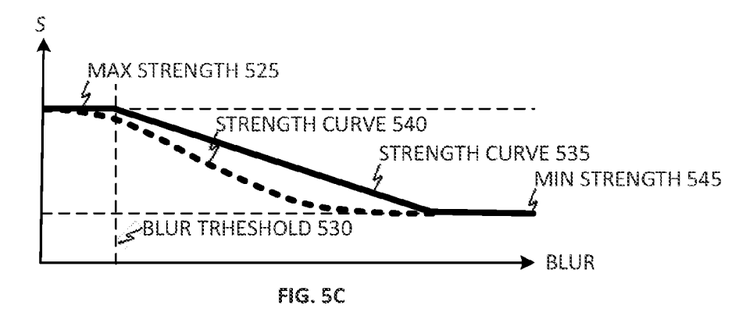
FIG. 5C illustrates the use of a target maximum strength function that is a function of blur amount, in accordance with one embodiment.

Finally, the operation 100 may optionally proceed to calculate a target max stabilization strength value for the current image (block 146). As mentioned above, the inventors have determined that, if the amount of blur in the image is smaller (typically found in brighter images with shorter integration times), larger stabilization strengths may be employed without affecting the aforementioned unwanted "shimmering" artifacts in the stabilized video. On the other hand, if the amount of blur in the image is larger (typically found in darker images with longer integration times), smaller stabilization strengths may be employed in an effort to mitigate the appearance of the aforementioned unwanted "shimmering" artifacts in the stabilized video (i.e., by letting the image sequence jitter slightly, rather than holding it perfectly stable, the motion blur will follow the natural trail of movement in the image sequence and not appear as anomalous to the viewer). FIG. 5C shows several approaches to translating the average overall image blur metric value (plotted along the x-axis) into a target max stabilization strength values (plotted along the y-axis). In the example of strength curve 535, a piecewise-linear function is employed, wherein the max strength value 525 is permissible up to a blur threshold value 530. Beyond the blur threshold value 530, the max strength value slopes downward until reaching the minimum strength value 545. According to one embodiment, the following equation may be employed to determine the target max strength value:

$$\text{targetStrength} = \text{maxStrength} - (\text{averageBlur} - \text{blurThreshold}) * \text{blurStrengthSlope}$$

(where blurStrengthSlope is the slope of the central portion of the strength curve 535). As shown in FIG. 1A block 108, FIG. 1B block 118, and FIG. 1C block 124, subsequent determinations of the video stabilization strength metric value, e.g., by analyzing the amount of movement in the "future frames" buffer, may be modulated by this calculated "target max strength" value (e.g., it may not be allowed to exceed the value of the target max strength), which was calculated based on the aforementioned motion blur determination. As also mentioned above, any form of video image stabilization (e.g., even one that does not utilized the "future frames" buffer approach) may benefit from the independent calculation of a "target max strength" value based on motion blur determination—especially in low light situations where motion blur is likely to be prevalent due to longer camera integration times.

As will be understood by those of skill in the art, other types of curves, such as strength curve 540 may also be employed, e.g., cubics, quadratics, arctangents, etc., so long as the curve is continuous across the range of overall image blur metric values and stays within the bounds of the maximum permissible strength value 525 and the minimum strength value 545.

Figure 3:
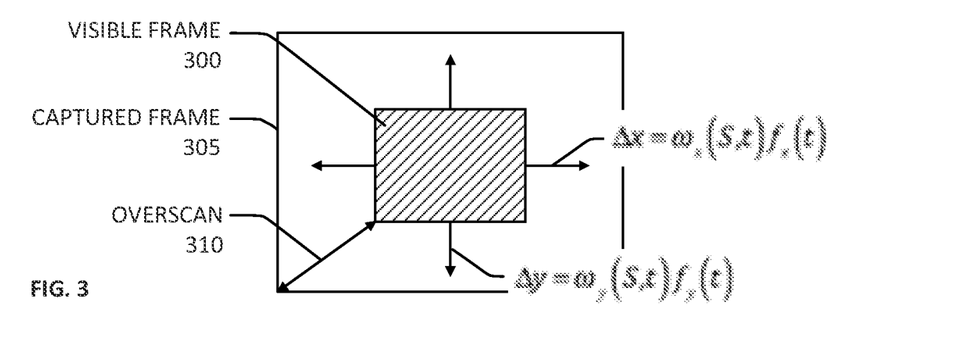
FIG. 3 illustrates the movement that can be applied to a visible region of a frame within its overscan during stabilization operations, in accordance with this disclosure.
Figure 4:
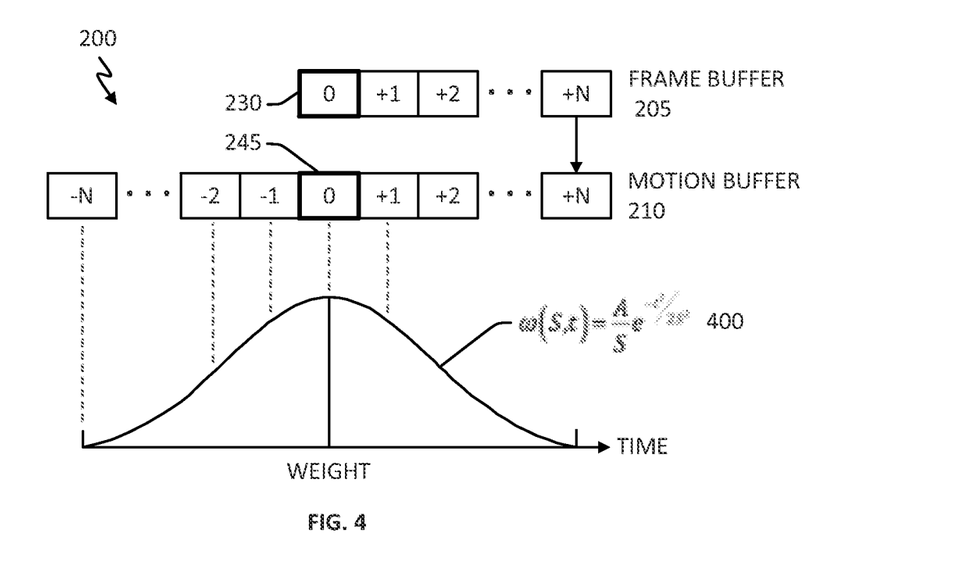
FIG. 4 illustrates a stabilization strength function, in accordance with one embodiment.

Referring now to FIG. 3, motion of visible frame 300 within captured frame 305 (the difference being overscan 310) is shown functionally:

$$\Delta x = \omega_x(S,t) f_x(t) \qquad \text{EQ. 1A}$$

$$\text{and } \Delta y = \omega_y(S,t) f_y(t), \qquad \text{EQ. 1B}$$

where $\Delta x$ and $\Delta y$ represent the amount of motion along x and y coordinate axes that the current frame should be moved in accordance with stabilization operation 100, $\omega_x(\ )$ and $\omega_y(\ )$ represent x and y coordinate weighting functions respectively, and functions $f_x(\ )$ and $f_y(\ )$ represent arbitrary movement functions (linear or non-linear) that are up to the discretion of the designer. It should be understood that while EQS. 1A and 1B describe translation only—actual correction may include other axes and other artifacts. For example, in one embodiment, video may be stabilized using gyroscope output (represented as quaternions) against rotation, perspective distortion and rolling shutter artifacts. In addition, multiple corrections to an image at various positions of the image's plane may be made rather than a single or global correction described here to deal with rolling shutter artifacts. In short, for each current frame, video stabilization operation 100 determines the smoothed motion sample based on past/future motion data, and determines the correction (difference) that needs to be applied to the motion data to make it equal the smoothed trajectory and, using this information and known camera (e.g., focus) and lens characteristics generates multiple perspective transforms which may then be applied to the image. (The size of overscan 310 has been grossly overstated in FIG. 3 for illustrative purposes. Typical sizes for overscan 310 are between 3% to 10% of a captured frame's horizontal and vertical extent.) In general, stabilization strength S may vary from buffer entry-to-buffer entry and, as a result, weighting values $\omega_x(\ )$ and $\omega_y(\ )$ may also vary from buffer entry-to-buffer entry. Referring to FIG. 4, in one embodiment, stabilization strength S may be the standard deviation of Gaussian weighting function 400 (400 could represent either, or both, $\omega_x(\ )$ and $\omega_y(\ )$ of EQS. 1A and 1B). As shown in illustrative weighting function 400, time may correspond to the buffered motion data's index, positive and negative. By way of example, the weight value assigned to the current entry (time=0, buffer entries 230 and 245) would be the maximum value of function 400 which, for purposes of this disclosure may be taken to be 1.0.

Returning again to FIG. 1A, once buffer system 200 is initialized, the current frame's initial stabilization motion (e.g., as provided by EQS. 1A and 1B) may be determined (block 108). For a given stabilization strength S (as optionally limited by the calculated "target max strength" for the current frame, per the discussion with reference to FIG. 1D), a frame's $\Delta x$ and $\Delta y$ values are simply functions of time (e.g., motion buffer entry index) as follows:

$$\Delta x = K_x \sum_{t=-(N-1)}^{(N-1)} w(t) f_x(t), \qquad \text{EQ. 2A}$$

and $$\Delta x = K_y \sum_{t=-(N-1)}^{(N-1)} w(t) f_x(t), \qquad \text{EQ. 2B}$$

where $K_x$ and $K_y$ are constants based on, in part, the current stabilization strength value, $\omega_x(\ )$ and $\omega_y(\ )$ may have a form as shown in FIG. 4, and $f_x(t)$ and $f_y(t)$ are as described above. Based on results given by EQS. 2A and 2B, a test may be made to determine if the current frame remains within its overscan and, if it does (the "YES" prong of block 110), another test may be made to determine if the buffer's future entries also fit (block 112).

A positive response to block 110 means the current frame has been determined to fit within its overscan. The remaining actions of operation 100 seek to predict if the current frame's future frames will fit in their overscan using the same strength parameter. As long as the current stabilization strength value is found to do this, that value is used. When one of the current frame's future frames does not fit in its overscan, the stabilization strength value may be lowered until a value is found that predicts it will fit. (See discussion below regarding blocks 124-136). In some embodiments, when a future frame is found that necessitates a change in the stabilization strength value (e.g., due either to motion blur or projected movement outside the overscan region), the operation may proceed by beginning to adjust the stabilization strength value downward (or upward) for the current frame and each successive frame, so that, when the future frame necessitating the change in stabilization strength values becomes the "current frame," the stabilization strength value will have gradually and smoothly reached its new target value, thus avoiding any abrupt or jarring changes in the stabilization strength value or the resulting stabilized video.

If the current frame's future frames also fit within their overscan (the "YES" prong of block 112), the current frame may be updated to account for the determined $\Delta x$ and $\Delta y$ values and then both frame and motion data may be shifted (block 114). As part of the shift process, the current frame may be transferred to storage 240. In one embodiment, the current frame's data may be altered in accordance with calculated $\Delta x$ and $\Delta y$ values prior to shift and store operations 114. In another embodiment, frame metadata may be altered instead. As used here, the term "frame data" refers to image data (e.g., R, G, and B values), whereas the term "frame metadata" or "metadata" refers to any information incorporated into a video/image frame that is not image data, such as motion data, f-stop, focal length, white balance, gains, geo-local data, etc. If additional frames remain to be processed (the "YES" prong of block 116), stabilization operation 100 continues at block 106.

If the current frame's calculated stabilization movements Δx and Δy do not permit the visible portion of the current frame to remain within its overscan (the "NO" prong of block 110), stabilization operation 100 continues at block 118 in FIG. 1B. Initially, the stabilization strength S may be changed by some amount (as optionally limited by the calculated "target max strength" for the current frame, per the discussion with reference to FIG. 1D) (block 118). For example, stabilization strength S may be reduced in fixed steps of 0.1. In another embodiment, stabilization strength S may be reduced by a specified percentage of the current value, for example, 10%. Turning again to FIG. 4, it can be seen that decreasing the value of S has the effect of reducing the spread of the Gaussian weighting function. This, in turn, attributes more weight/significance to those entries closer to the current frame with respect to a weighting function having a larger S value. Based on the new stabilization strength value, EQS. 2A and 2B may be used to determine Ax and Ay stabilization motion values (block 120). If the new adjustments still do not permit the current frame to fit within its overscan (the "NO" prong of block 122), operation 100 continues at block 118, where actions 118-122 may be repeated until a stabilization strength value S is found that permits the current frame to stay within its overscan. If, after calculating stabilization motions in accordance with block 120, the current frame fits within its overscan (the "YES" prong of block 122), operation 100 continues at block 112 in FIG. 1A.

Returning to FIG. 1A, if the current frame's future frames are determined not to fit within their overscan for the given stabilization strength (the "NO" prong of block 112), operation 100 continues at block 124 in FIG. 1C. In general, blocks 124-128 perform as do blocks 118-122. If a future frame is amenable to a higher stabilization strength than its immediately prior frame, actions in accordance with block 124 may increase the stabilization strength value (as optionally limited by the calculated "target max strength" for the current frame, per the discussion with reference to FIG. 1D). In general, it has been found advantageous to set a frame's stabilization strength value to as high a value as possible while still respecting the frame's overscan boundary. If, after having its stabilization strength value adjusted, a frame fits within its overscan (the "YES" prong of block 128), another check may be made to determine if its value is such that it may be beneficial to smooth the transition between itself and prior frames (block 130). Referring to FIGS. 5A and 5B, if the stabilization strength difference between frames 500 and 505 is small (the "NO" prong of block 130), no smoothing of the stabilization strength value need take place. If the stabilization strength difference between frames 510 and 515 is large or greater than some threshold—a value up to the designer (the "YES" prong of block 130), a smoothing trajectory of the stabilization strength value, such as trajectory 520, may be employed (block 132). It is noted that the shape of stabilization strength value smoothing trajectory 520 is only illustrative. The actual shape may be anything that meets the needs and goals of the image capture system. For example, in another embodiment, stabilization strength value smoothing trajectory 520 could be linear, or could start at a frame other than that shown (e.g., toward the abrupt transition). (It should be understood the "trajectory" of the strength parameter S as described here is a stand-in for the smoothed/stabilized trajectory of the image capture device. One of ordinary skill in the art will understand they are not the same.) As will be discussed in more detail, operation 100's ability to look into the "future" provides it a unique ability to anticipate abrupt movements in the future and begin adjusting the strength value of values before the abruptness occurs so that visible jumps or glitches in the final video sequence may be reduced or eliminated. Next, a check may be made to determine if the current frame (from FIGS. 1A and 1B) has any more future frames (block 134). If additional future frames exist (the "YES" prong of block 134), the next future frame is selected where after operation 100 continues at block 128. If there are no further future frames to evaluate (the "NO" prong of block 134), operation 100 continues at block 112 in FIG. 1A. Returning once more to FIG. 1A, after the current frame has been updated in accordance with stabilization operation 100 and shifted into storage (block 116), if there are no more frames to evaluate (the "NO" prong of block 116), stabilization operation 100 is complete.

Figure 6:
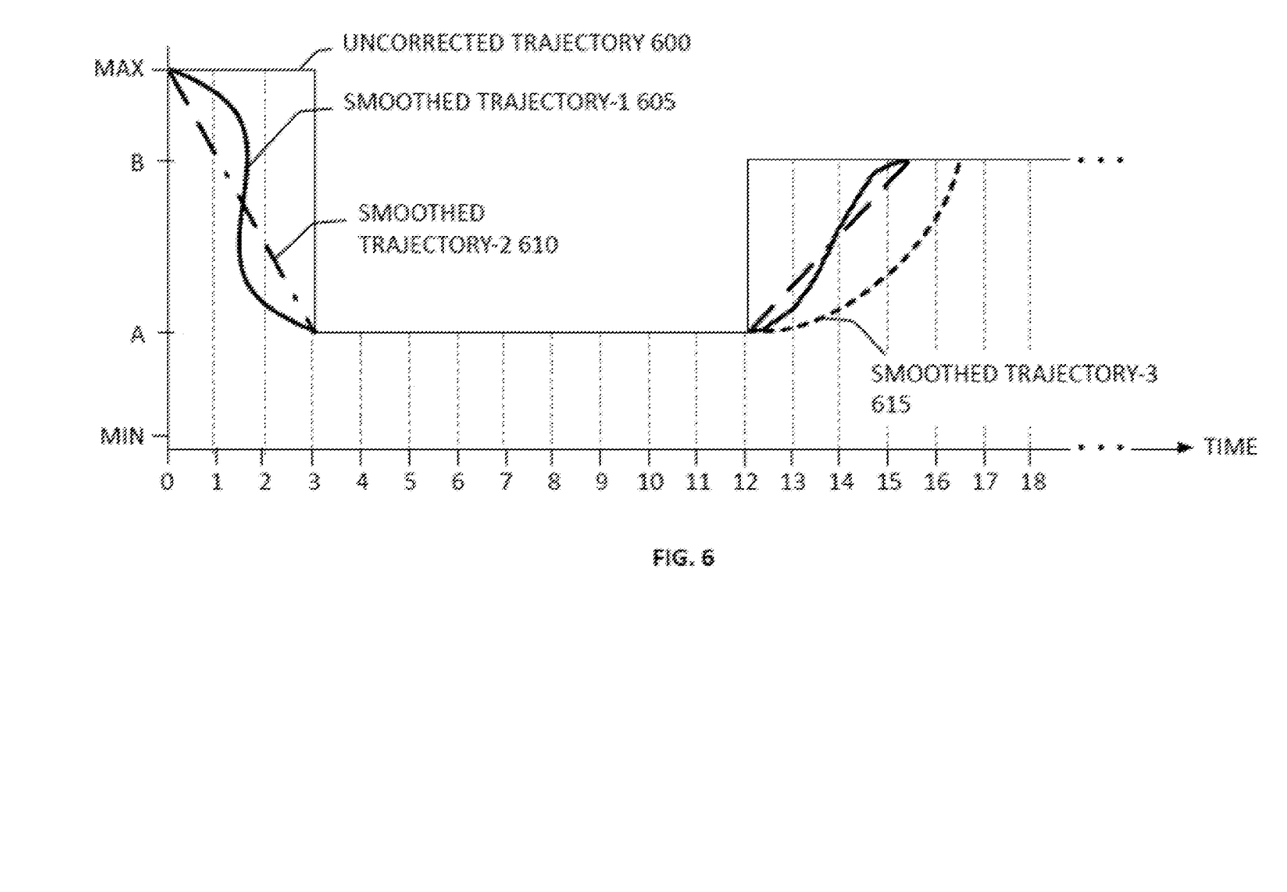
FIG. 6 shows illustrative stabilization strength trajectories, in accordance with one embodiment.

To see how stabilization operation 100 may be applied, consider FIG. 6. Uncorrected trajectory 600 represents the change in stabilization strength value needed to stabilize a video stream without the benefit of video stabilization methods in accordance with this disclosure. The abrupt changes in stabilization strength at t=3 and 12 (necessitated by motion of the image capture device as reflected in gyroscope motion metadata associated with the incoming frames) may cause a visual flicker, jump, or other discontinuity during video stream playback. As will be discussed in more detail below, each of smooth trajectory 1 605 and smooth trajectory 2 610 represent but two possible smoothed trajectories that may be provided in accordance with operation 100.

At t=0 an initial stabilization strength equal to MAX is found to adequately adjust the current frame (see 102-110). In one embodiment, each frame's initial stabilization strength value may be set equal to a maximum value, MAX. In another embodiment, each frame's initial stabilization weight may be set equal to a minimum value, MIN. In yet another embodiment, each frame's initial stabilization weight may be set equal to that of its immediate "past" frame. Following evaluation of the current frame, each of the current frame's buffered "future" frames may be tested to determine what stabilization strength value they may need to remain stabilized (see 112) (as optionally limited by the calculated "target max strength" for the frame, per the discussion with reference to FIG. 1D). This process repeats for each successive future frame until, at t=3 the frame's stabilization strength value must be reduced to A in order to remain within the overscan limit (see 124-128). Once this is determined, stabilization operation 100 may select any acceptable smoothing function to get from a stabilization strength of MAX at t=0 to a stabilization strength of A at t=3 (see 130-132). In one embodiment, a smoothing function may be chosen such that the smoothed trajectory takes on a sigmoidal shape, as in smoothed trajectory-1 605. In another embodiment, a smoothing function may be chosen such that the smoothed trajectory takes on a linear shape, as in smoothed trajectory-2 610. In practice, any smoothing function that changes the stabilization strength value over time so as to result in a smoothened frame-to-frame adjustment of video images that meets the needs or goals of the system under design may be used, e.g., a linear function, an exponential function, a parabolic function, a quadratic function, a stair step function, etc. As shown in FIG. 6, the stabilization strength values previously calculated for buffered frames at t=1 and 2 may be changed so as to accommodate the stabilization strength needed in one or more "future" frames in the buffer, e.g., based on the amount of device motion and/or motion blur detected in such "future" frames. Once a smoothed trajectory has been selected and a stabilization weight determined at t=3, evaluation of the current frame's future buffer continues (see 106-112) until, e.g., at t=12 when another abrupt change is detected (indicative of the image capture device being moved abruptly), device motion and/or motion blur in such future frames may be evaluated to see if there is a new stabilization strength value that the operation needs to begin moving towards. While the operation of generating smoothed trajectories 605 and 610 at t=12 is similar to that discussed above, increasing the stabilization strength can require the consideration of additional factors. First, a change in stabilization strength value from 1 to 2 represents a much larger change than a change from 10 to 9 or 9 to 10. To address this issue, it has been found to be beneficial to increase the stabilization strength slowly, resulting in a more gradually corrected trajectory, such as shown in smoothed trajectory-3 615. While virtually any function may be used to adjust the stabilization strength value over time, smoothed trajectory 615 reflects a percentage-increase regime, where each increment in the stabilization strength value is a specified percentage of the prior value. By way of example, if the percentage-increase quota is 10%, and the value of the stabilization strength parameter for the current frame is 1, the next value would be 1.1. If the current value is 10, the next value would be 11. It is noted, a falling stabilization strength value is more difficult to accommodate than a rising value. When ramping down, a value certain must be reached within a given window to avoid creating a visual aberration. When ramping up, one has more flexibility in selecting the regime, as all stabilization strength values below actually fit within the frame's overscan. Further, in an increasing stabilization strength situation, it may be beneficial to increase the stabilization strength to its maximum value or until it is just high enough where the current frame will not fit within its overscan; after which, the strength may be decreased to that value which just permitted the frame to fit. Finally, after a current frame (see 106-110 and 118-122) and its future frames (see 112 and 130-136) have been evaluated and its stabilization strength modified as necessary, the current frame's image data (or metadata) may be updated in accordance with EQS. 2A and 2B (at this point S will be a fixed value) to reflect the determined stabilization motions, the current frame may be shifted out of the buffer system (e.g., buffer system 200) and stored (e.g., in storage 240), and each entry in frame buffer (e.g., frame buffer 205) and motion buffer (e.g., motion buffer 210) may be shifted (see 114) to make room for a new frame (e.g., new frame 220). Following shift and store (see 114), each successive video frame may be evaluated (e.g., via 116) until all frames in the current frame buffer 205 have been evaluated and stabilized (e.g., using motion data and/or motion blur data in motion buffer 210).

Figure 7:
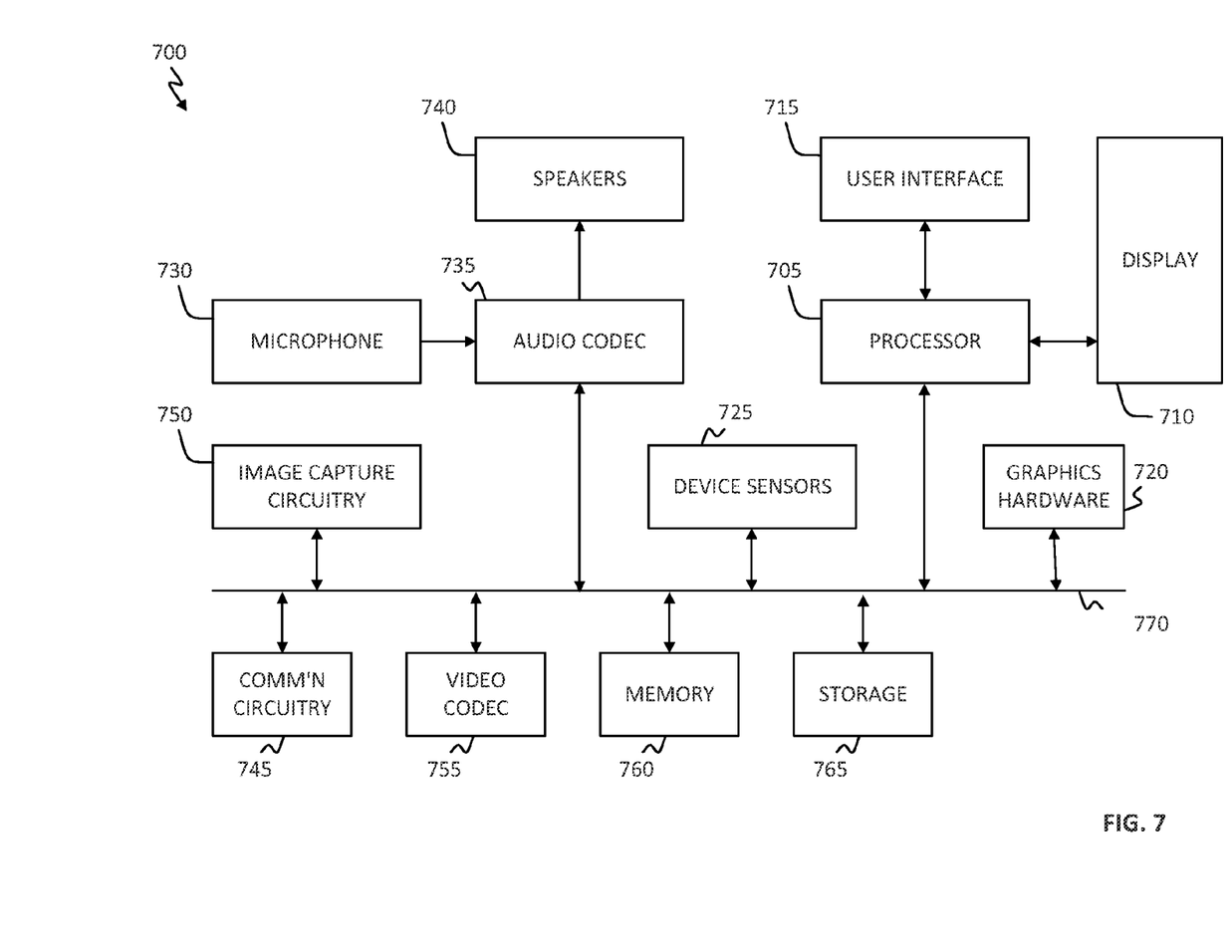
FIG. 7 shows, in block diagram form, a multi-function electronic device, in accordance with one embodiment.

Referring to FIG. 7, a simplified functional block diagram of illustrative electronic device 700 is shown according to one embodiment. Electronic device 700 could be, for example, a mobile telephone, personal media device, portable camera, or a tablet, notebook or desktop computer system. As shown, electronic device 700 may include processor 705, display 710, user interface 715, graphics hardware 720, device sensors 725 (e.g., proximity sensor/ambient light sensor, accelerometer and/or gyroscope), microphone 730, audio codec(s) 735, speaker(s) 740, communications circuitry 745, image capture circuit or unit 750, video codec(s) 755, memory 760, storage 765, and communications bus 770.

Processor 705 may execute instructions necessary to carry out or control the operation of many functions performed by device 700 (e.g., such as the generation and/or processing of video stream in accordance with FIGS. 1, 2, 5 and 6). Processor 705 may, for instance, drive display 710 and receive user input from user interface 715. User interface 715 can take a variety of forms, such as a button, keypad, dial, a click wheel, keyboard, display screen and/or a touch screen. User interface 715 could, for example, be the conduit through which a user may view a captured video stream. In one embodiment, display 710 may display a video stream as it is captured while processor 705 and/or graphics hardware 720 and/or image capture circuitry contemporaneously generate a stabilized version of the captured video stream storing the stabilized video stream in memory 760 and/or storage 765. In another embodiment, display 710 may display a stabilized version of a captured video sequence as it is captured (with a delay approximately equal to the buffer system initialization time (see 104 and FIGS. 2A and 2B)). Processor 705 may be a system-on-chip such as those found in mobile devices and include one or more dedicated graphics processing units (GPUs). Processor 705 may be based on reduced instruction-set computer (RISC) or complex instruction-set computer (CISC) architectures or any other suitable architecture and may include one or more processing cores. Graphics hardware 720 may be special purpose computational hardware for processing graphics and/or assisting processor 705 perform computational tasks. In one embodiment, graphics hardware 720 may include one or more programmable graphics processing units (GPUs).

Image capture circuitry 750 may capture video images that may be processed to generate stabilized video in accordance with this disclosure. Output from image capture circuitry 750 may be processed, at least in part, by video codec(s) 755 and/or processor 705 and/or graphics hardware 720, and/or a dedicated image processing unit incorporated within circuitry 750. Images so captured may be stored in memory 760 and/or storage 765. Memory 760 may include one or more different types of media used by processor 705, graphics hardware 720, and image capture circuitry 750 to perform device functions. For example, memory 760 may include memory cache, read-only memory (ROM), and/or random access memory (RAM). Storage 765 may store media (e.g., audio, image and video files), computer program instructions or software, preference information, device profile information, and any other suitable data. Storage 765 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 760 and storage 765 may be used to retain computer program instructions or code organized into one or more modules and written in any desired computer programming language. When executed by, for example, processor 705 such computer program code may implement one or more of the methods described herein.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). For example, various smoothing regimes may be used together. Further, FIGS. 1A-1D show flowcharts illustrating a general video stabilization operation in accordance with the disclosed embodiments. In one or more embodiments, one or more of the disclosed steps may be omitted, repeated, and/or performed in a different order than that described herein. Accordingly, the specific arrangement of steps or actions shown in FIGS. 1A-1D should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device comprising instructions stored thereon to cause one or more processors to:
obtain a first time-sequenced set of images, wherein each image in the first time-sequenced set of images is associated with a capture time and motion information;
select a current image from the first time-sequenced set of images;
identify a first stabilization strength metric value for the current image, wherein the first stabilization strength metric value determines, at least in part, an amount of contribution of the motion information of one or more images other than the current image from the first time-sequenced set of images to the stabilization of the current image;
adjust the first stabilization strength metric value based, at least in part, on an estimated amount of motion blur in the current image, wherein the estimated amount of motion blur in the current image is based, at least in part, on at least part of the motion information associated with the current image;
apply the adjusted first stabilization strength metric value to the current image to stabilize the current image; and
store the stabilized current image in a memory.

2. The non-transitory program storage device of claim 1, wherein the motion information for each image comprises gyroscope information.

3. The non-transitory program storage device of claim 2, wherein the gyroscope information comprises one or more time stamped gyroscope data points.

4. The non-transitory program storage device of claim 1, wherein the instructions to estimate the amount of motion blur in the current image based, at least in part, on at least part of the motion information associated with the current image further comprise instructions to calculate an image row blur metric for one or more rows of pixels in the current image.

5. The non-transitory program storage device of claim 4, wherein the instructions to estimate the amount of motion blur in the current image based, at least in part, on at least part of the motion information associated with the current image further comprise instructions to calculate an overall image blur metric based, at least in part, on the one or more calculated image row blur metrics for the current image.

6. The non-transitory program storage device of claim 3, wherein the instructions to estimate the amount of motion blur in the current image based, at least in part, on at least part of the motion information associated with the current image further comprise instructions to calculate the beginning and ending integration time of one or more rows of pixels in the current image based, at least in part, on one or more of: one or more time stamped gyroscope data points for the current image, a rolling shutter readout time, and an exposure time.

7. The non-transitory program storage device of claim 1, wherein the instructions to adjust the first stabilization strength metric value based, at least in part, on an estimated amount of motion blur in the current image further comprise instructions to limit the first stabilization strength metric value to a calculated target maximum value.

8. A video image stabilization method, comprising:
obtaining a first time-sequenced set of images, wherein each image in the first time-sequenced set of images is associated with a capture time and motion information;
selecting a current image from the first time-sequenced set of images;
identifying a first stabilization strength metric value for the current image, wherein the first stabilization strength metric value determines, at least in part, an amount of contribution of the motion information of one or more images other than the current image from the first time-sequenced set of images to the stabilization of the current image;
adjusting the first stabilization strength metric value based, at least in part, on an estimated amount of motion blur in the current image, wherein the estimated amount of motion blur in the current image is based, at least in part, on at least part of the motion information associated with the current image;
applying the adjusted first stabilization strength metric value to the current image to stabilize the current image; and
storing the stabilized current image in a memory.

9. The method of claim 8, wherein the motion information for each image comprises one or more time stamped gyroscope data points.

10. The method of claim 8, wherein the act of estimating the amount of motion blur in the current image based, at least in part, on at least part of the motion information associated with the current image further comprises calculating an image row blur metric for one or more rows of pixels in the current image.

11. The method of claim 10, wherein the act of estimating the amount of motion blur in the current image based, at least in part, on at least part of the motion information associated with the current image further comprises calculating an overall image blur metric based, at least in part, on the one or more calculated image row blur metrics for the current image.

12. The method of claim 9, wherein the act of estimating the amount of motion blur in the current image based, at least in part, on at least part of the motion information associated with the current image further comprises calculating the beginning and ending integration time of one or more rows of pixels in the current image based, at least in part, on one or more of: one or more time stamped gyroscope data points for the current image, a rolling shutter readout time, and an exposure time.

13. The method of claim 8, wherein the act of adjusting the first stabilization strength metric value based, at least in part, on an estimated amount of motion blur in the current image further comprises limiting the first stabilization strength metric value to a calculated target maximum value.

14. A video image capture device, comprising:
an image sensor;
memory communicatively coupled to the image sensor;
one or more motion sensors;

one or more processors operatively coupled to the image sensor, the memory and the one or more motion sensors configured to:
  obtain a first time-sequenced set of images, wherein each image in the first time-sequenced set of images is associated with a capture time and motion information;
  select a current image from the first time-sequenced set of images;
  identify a first stabilization strength metric value for the current image, wherein the first stabilization strength metric value determines, at least in part, an amount of contribution of the motion information of one or more images other than the current image from the first time-sequenced set of images to the stabilization of the current image;
  adjust the first stabilization strength metric value based, at least in part, on an estimated amount of motion blur in the current image, wherein the estimated amount of motion blur in the current image is based, at least in part, on at least part of the motion information associated with the current image;
  apply the adjusted first stabilization strength metric value to the current image to stabilize the current image; and
  store the stabilized current image in a memory.

15. The video image capture device of claim 14, wherein the motion information for each image comprises gyroscope information.

16. The video image capture device of claim 15, wherein the gyroscope information comprises one or more time stamped gyroscope data points.

17. The video image capture device of claim 14, wherein the instructions to estimate the amount of motion blur in the current image based, at least in part, on at least part of the motion information associated with the current image further comprise instructions to calculate an image row blur metric for one or more rows of pixels in the current image.

18. The video image capture device of claim 17, wherein the instructions to estimate the amount of motion blur in the current image based, at least in part, on at least part of the motion information associated with the current image further comprise instructions to calculate an overall image blur metric based, at least in part, on the one or more calculated image row blur metrics for the current image.

19. The video image capture device of claim 16, wherein the instructions to estimate the amount of motion blur in the current image based, at least in part, on at least part of the motion information associated with the current image further comprise instructions to calculate the beginning and ending integration time of one or more rows of pixels in the current image based, at least in part, on one or more of: one or more time stamped gyroscope data points for the current image, a rolling shutter readout time, and an exposure time.

20. The video image capture device of claim 14, wherein the instructions to adjust the first stabilization strength metric value based, at least in part, on an estimated amount of motion blur in the current image further comprise instructions to limit the first stabilization strength metric value to a calculated target maximum value.

* * * * *